US006800877B2

(12) United States Patent
Victor et al.

(10) Patent No.: US 6,800,877 B2
(45) Date of Patent: Oct. 5, 2004

(54) SEMI-CONDUCTOR INTERCONNECT USING FREE SPACE ELECTRON SWITCH

(75) Inventors: Michel N. Victor, Sunnyside, NY (US); Aris Silzars, Sammamish, WA (US)

(73) Assignee: Exaconnect Corp., Flint, MI (US)

( * ) Notice: Subject to any disclaimer, the term of this patent is extended or adjusted under 35 U.S.C. 154(b) by 0 days.

(21) Appl. No.: 10/164,325

(22) Filed: Jun. 6, 2002

(65) Prior Publication Data

US 2003/0076047 A1 Apr. 24, 2003

Related U.S. Application Data

(63) Continuation-in-part of application No. 09/898,264, filed on Jul. 3, 2001, now Pat. No. 6,545,425, which is a continuation-in-part of application No. 09/731,216, filed on Dec. 6, 2000, now Pat. No. 6,407,516.
(60) Provisional application No. 60/207,391, filed on May 26, 2000, provisional application No. 60/232,927, filed on Sep. 15, 2000, provisional application No. 60/216,031, filed on Jul. 3, 2000, provisional application No. 60/222,033, filed on Jul. 31, 2000, provisional application No. 60/245,584, filed on Nov. 6, 2000, provisional application No. 60/261,209, filed on Jan. 16, 2001, provisional application No. 60/260,874, filed on Jan. 12, 2001, provisional application No. 60/262,363, filed on Jan. 19, 2001, provisional application No. 60/265,866, filed on Feb. 5, 2001, provisional application No. 60/272,326, filed on Mar. 2, 2001, provisional application No. 60/294,329, filed on May 30, 2001, provisional application No. 60/296,335, filed on Jun. 6, 2001, and provisional application No. 60/326,553, filed on Oct. 2, 2001.

(51) Int. Cl.[7] .............................. H01L 29/74; G01J 5/20
(52) U.S. Cl. ........................ 257/110; 257/114; 257/684; 250/338.4; 250/336.2; 359/154
(58) Field of Search ................................ 257/110, 114, 257/684, 663, 621, 661, 782, 68; 250/338.4, 336.2; 359/154; 505/239, 220, 230–235; 315/169.3, 169.4

(56) References Cited

U.S. PATENT DOCUMENTS

| 2,667,599 A | 1/1954 | Rajchman |
| 3,641,384 A | 2/1972 | Lund et al. |
| 3,740,607 A | 6/1973 | Silzars et al. |

(List continued on next page.)

FOREIGN PATENT DOCUMENTS

| EP | 0 265 888 A2 A3 | 5/1988 |
| EP | 0 306 173 A1 | 3/1989 |
| EP | 9 530 981 A1 | 3/1993 |
| EP | 11204047 | 7/1999 |
| ES | 2 024 941 | 3/1992 |
| GB | 1417297 | 12/1975 |
| GB | 2 318 208 A | 4/1998 |

OTHER PUBLICATIONS

W.J. Orvis, et al., "A Progress Report on the Livermore Miniature Vacuum Tube Project", 1989, Lawrence Livermore National Laboratory, pp. 20.3.1–20.3.3,20.4.1–20.4.4.
Yoshiko Hara, "Cold Cathode Emitter Promises Ultra–Bright Flat Panels", EETimes.com, http://eet/com/news/97/947news/emitter.html, 2 pgs.
Ray Horak, "Communications Systems & Networks", 2nd edition, The M&T Networking Technology Series, 1999, pp, 2, 22, 82, 83, 163, 254, 266, 267, 342–344.

Primary Examiner—Tuyet T. Vo
(74) Attorney, Agent, or Firm—Harness, Dickey & Pierce, P.L.C.

(57) ABSTRACT

An apparatus and method for electrically connecting semi-conductor devices is disclosed. The apparatus and method employs a vacuum chamber and first and second semi-conductor components. The first and second semi-conductor components are coupled to a vacuum chamber and free space electron transmitters and receivers. The transmitters are configured to transmit a signals between the semi-conductor components.

31 Claims, 8 Drawing Sheets

U.S. PATENT DOCUMENTS

| | | |
|---|---|---|
| 3,749,961 A | 7/1973 | Bates et al. |
| 3,893,157 A | 7/1975 | Silzars et al. |
| 3,935,500 A | 1/1976 | Oess et al. |
| 3,936,690 A | 2/1976 | Salgo |
| 3,943,277 A | 3/1976 | Everly et al. |
| 3,980,919 A | 9/1976 | Bates et al. |
| 4,110,749 A | 8/1978 | Janko et al. |
| 4,207,492 A | 6/1980 | Tomison et al. |
| 4,213,192 A | 7/1980 | Christensen, Sr. |
| 4,280,186 A | 7/1981 | Hidai et al. |
| 4,328,466 A | 5/1982 | Norris, Jr. et al. |
| 4,333,035 A | 6/1982 | Parker et al. |
| 4,663,559 A | 5/1987 | Christensen |
| 4,725,736 A | 2/1988 | Crewe |
| 4,760,567 A | 7/1988 | Crewe |
| 4,764,818 A | 8/1988 | Crew |
| 4,817,053 A | 3/1989 | Ikeda et al. |
| 5,012,153 A | 4/1991 | Atkinson et al. |
| 5,068,580 A | 11/1991 | Smith et al. |
| 5,077,143 A | 12/1991 | Barraclough et al. |
| 5,150,019 A | 9/1992 | Thomas et al. |
| 5,475,280 A | 12/1995 | Jones et al. |
| 5,541,473 A | 7/1996 | Duboc, Jr. et al. |
| 5,557,177 A | 9/1996 | Engle |
| 5,557,596 A | 9/1996 | Gibson et al. |
| 5,561,339 A | 10/1996 | Jones et al. |
| 5,572,042 A | 11/1996 | Thomas et al. |
| 5,578,901 A | 11/1996 | Blanchet-Fincher et al. |
| 5,598,408 A | 1/1997 | Nickolls et al. |
| 5,608,283 A | 3/1997 | Twichell et al. |
| 5,625,563 A * | 4/1997 | Rostoker et al. ............... 716/2 |
| 5,650,337 A | 7/1997 | Cahen et al. |
| 5,746,635 A | 5/1998 | Spindt et al. |
| 5,767,620 A | 6/1998 | Onodaka |
| 5,793,155 A | 8/1998 | Vasche |
| 5,814,926 A | 9/1998 | Tomihari |
| 5,834,331 A | 11/1998 | Razeghi |
| 5,858,619 A | 1/1999 | Chang et al. |
| 5,869,842 A | 2/1999 | Kang et al. |
| 5,894,188 A | 4/1999 | Chakvorty et al. |
| 5,965,872 A * | 10/1999 | Endo et al. ............... 250/208.1 |
| 5,986,399 A | 11/1999 | Van Veen et al. |
| 6,002,199 A | 12/1999 | Spindt et al. |
| 6,008,126 A | 12/1999 | Leedy |
| 6,010,918 A | 1/2000 | Marino et al. |
| 6,020,257 A | 2/2000 | Leedy |
| 6,040,808 A | 3/2000 | Knox et al. |
| 6,042,900 A | 3/2000 | Rakhimov et al. |
| 6,051,921 A | 4/2000 | Beetson et al. |
| 6,057,636 A | 5/2000 | Sakai et al. |
| 6,060,331 A | 5/2000 | Shakouri et al. |
| 6,097,092 A | 8/2000 | Natzle |
| 6,124,665 A | 9/2000 | Derraa |
| 6,137,214 A | 10/2000 | Raina |
| 6,144,144 A | 11/2000 | Cleeves et al. |
| 6,171,971 B1 | 1/2001 | Natzle |
| 6,201,343 B1 | 3/2001 | Spindt et al. |
| 6,201,851 B1 | 3/2001 | Piestrup et al. |
| 6,204,087 B1 | 3/2001 | Parker et al. |
| 6,204,596 B1 | 3/2001 | Macaulay et al. |
| 6,215,243 B1 | 4/2001 | Janning |

\* cited by examiner-

E. LOGIC BLOCK/I/O DIMENSIONS 10- mm2 LOGIC BLOCK
(EITHER PROCESSOR, DRAM, OR SERIAL PORT)

10- mm2 OF BGA

FIG. 6

SEMI-CONDUCTOR INTERCONNECT USING FREE SPACE ELECTRON SWITCH

CROSS-REFERENCE TO RELATED APPLICATIONS

This application is a continuation-in-part application of U.S. Ser. No. 09/898,264, entitled "The Use of a Free Space Electron Switch in a Telecommunications Network", filed Jul. 3, 2001, now U.S. Pat. No. 6,545,425 which is a continuation-in-part application of U.S. Ser. No. 09/731, 216, entitled "Free Space Electron Switch", filed Dec. 6, 2000, now U.S. Pat. No. 6,407,516 which claims the benefit of priority of U.S. provisional applications: Ser. No. 60/207, 391, entitled "Free Space Electron Switch Fabric", filed May 26, 2000; Ser. No. 60/232,927, entitled "Optical Switch", filed Sep. 15, 2000, which also claims the benefit of priority of U.S. provisional applications: Ser. No. 60/216,031, entitled "Freespace Electron Switch Fabric, filed Jul. 3, 2000; Ser. No. 60/222,003, entitled "Freespace Electron Multiplexer (serializer) and Demultiplexer (deserializer)", filed Jul. 31, 2000; Ser. No. 60/245,584, entitled "Photon-Electron-Photon Switch", filed Nov. 6, 2000; Ser. No. 60/261,209, entitled Switching and Processing Using Freespace Electrons", filed Jan. 16, 2001; Ser. No. 60/260, 874, entitled "Details of a Freespace Electron Switch", filed Jan. 12, 2001; Ser. No. 60/262,363, entitled "An Analog Serializer and Deserializer", filed Jan. 19, 2001; Ser. No. 60/265,866, entitled "Vacuum Microelectronic Components", filed Feb. 5, 2001; Ser. No. 60/272,326, entitled "A Photocathode-Based Optical Receiver", filed Mar. 2, 2001; Ser. No. 60/294,329 entitled "Telecommunication's Switch Subsystem for the Access, Metro and Core Infrastructure", filed May 30, 2001. This application claims the benefit of U.S. provisional applications: Ser. No. 60/296, 335, entitled "Free Space Electron Chip-to-Chip Interconnect", filed Jun. 6, 2001, and Ser. No. 60/326,553, entitled "Chip-to-Chip Interconnections for Computing/Processing Applications", filed Oct. 2, 2001, the entire contents of all of the above are hereby incorporated by reference into the present application.

FIELD OF THE INVENTION

The present invention relates to the interconnection of semiconductor devices, and more particularly to the use of free space electrons to couple semi-conductor and micro-processing devices.

BACKGROUND OF THE INVENTION

It has been a desire for a long time and continues to be such in the computer arts to produce a computing machine which can process large amounts of data in minimum time. Typically, instructions and data are forced to flow serially through a single, and hence central, processing unit (CPU). The bit width of the processor's address/data bus (i.e., 8, 16 or 32 bits wide) and the rate at which the processor (CPU) executes instructions (often measured in millions of instructions per second, "MIPS") tend to act as critical bottlenecks which restrict the flow rate of data and instructions. CPU execution speed and bus width must be continuously pushed to higher levels if processing time is to be reduced.

Attention is being directed to a different type of computing architecture where problems are solved not serially but rather by way of the simultaneous processing of parallel-wise available data using multiple processing units. These machines are often referred to as parallel processing arrays. The advantage of parallel processing is simple. Even though each processing unit may have a finite, and therefore speed-limiting, processor bandwidth, an array having a number of such processors will have a total computation bandwidth of a number of times the processor bandwidth.

The benefits derived from increasing the size of a parallel array are countered by a limitation in the speed at which messages can be transmitted to and through the parallel array, i.e., from one processor to another or between one processor and an external(input/output) device. Inter-processor messaging is needed so that intermediate results produced by one processing unit can be passed on to another processing unit within the array. Messaging between the array's parallel memory structure and external I/O devices such as high speed disks and graphics systems is needed so that problem data can be quickly loaded into the array and solutions can be quickly retrieved. The array's messaging bandwidth at the local level, which is the maximum rate in terms of bits per second that one randomly located processor unit can send a message to any other randomly located processor unit.

Hopefully, messaging should take place in parallel so that a multiple number, of processors are simultaneously communicating at one time thereby giving the array a parallel messaging bandwidth of multiple times the serial bandwidth. Ideally, the simultaneous communication should be equal to the number of processors in the array so the processors are simultaneously able to communicate with each other. Unfortunately, there are practical considerations which place limits on the speed and number of processors which can communicate with each other. Among these considerations are the maximum number of transistors and/or wires which can be defined on a practically-sized integrated circuit chip, the maximum number of integrated circuit's and/or wires which can be placed on a practically-sized printed circuit board and the maximum number of printed circuit boards which can be enclosed within a practically-sized card cage. Wire density is typically limited to a finite, maximum number of wires per square inch and this tends to limit the speed of processor communications in practically-sized systems.

If the ultimate goal of parallel processing is to be realized (unlimited expansion of array size with concomitant improvement in solution speed and price/performance ratio), ways must be found to maximize the parallel messaging bandwidth so that the latter factors do not become new bottlenecking limitations on the speed at which parallel machines can input problem data, exchange intermediate results within the array, and output a solution after processing is complete.

SUMMARY OF THE INVENTION

In accordance with the teachings of the present invention, an apparatus and method for electrically connecting semi-conductor devices in parallel which overcome the deficiencies of the prior art is disclosed. The apparatus and method employs a vacuum chamber and first and second semi-conductor components. In this regard, the first and second semi-conductor components are coupled to the vacuum chamber. The first semi-conductor component is connected to a first free space electron transmitter and a first free space electron receiver, while the second semi-conductor component is connected to a second free space electron transmitter and a second free space electron receiver. The free space electron transmitters and a free space electron receivers are disposed within the vacuum chamber. The first transmitter is configured to transmit a signal from the first semi-conductor component to the second free space electron receiver while the second transmitter is configured to transmit a signal from the second semi-conductor component to the first free space electron receiver.

In one embodiment, an electronic component has first and second substrates. A first member is disposed between the first and a second substrates, which defines a vacuum chamber. First and second semi-conductor components are coupled to the substrates. The first and second semi-conductor components are further connected with free space electron transmitters and free space electronic receivers which are disposed with the vacuum chamber. The semi-conductors are configured to transmit signals to each other through the free space electron receivers and transmitters.

In another embodiment, an electronic component having first and second substrates is disclosed. A first member is disposed between the first and a second substrates, that defines a vacuum chamber. First and second semi-conductor components are coupled to the substrates. The first and second semi-conductor components are further connected with free space electron transmitters and free space electronic receivers, which are disposed with the vacuum chamber. The semi-conductors are configured to transmit signals to each other through the free space electron receivers and transmitters. The free space electron transmitters have a cathode array, which includes a plurality of cathodes, each of the cathodes operable to emit electrons. Additionally the free space electron transmitter includes an anode or focusing grid. The anode grid includes a plurality of aiming anodes, each of the aiming anodes are operable to aim an electron beam formed from the electrons emitted from one of the cathodes. Additionally the free space electron transmitter has a focusing grid and an accelerating grid disposed between the cathode array and the free space electron receiver. The focusing grid and accelerating grid are operable to control the flow of electrons from each of the cathodes to the receiver.

In yet another embodiment, a parallel processing computer is disclosed. The parallel processing computer has first and second substrates, and a vacuum chamber disposed between the first and a second substrates. A first microprocessor is coupled to the first substrate, and is coupled to a first free space electronic transmitter. The first free space electron transmitter is disposed within the vacuum chamber. A second semi-conductor component is coupled to the second substrate, and is coupled to a second free space electron transmitter and a second free space electron receiver. The second free space electron transmitter and a second free space electron receiver are disposed within the vacuum chamber. The first free space electron transmitter is configured to transmit a signal from the first microprocessor component to the second free space electron receiver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 5 and 6 are block diagrams showing the operation of the switch shown in FIG. 1;

DETAILED DESCRIPTION OF THE PREFERRED EMBODIMENTS

The following description of the preferred embodiments are merely exemplary in nature and is in no way intended to limit the invention, its application, or uses.

Figure 1:
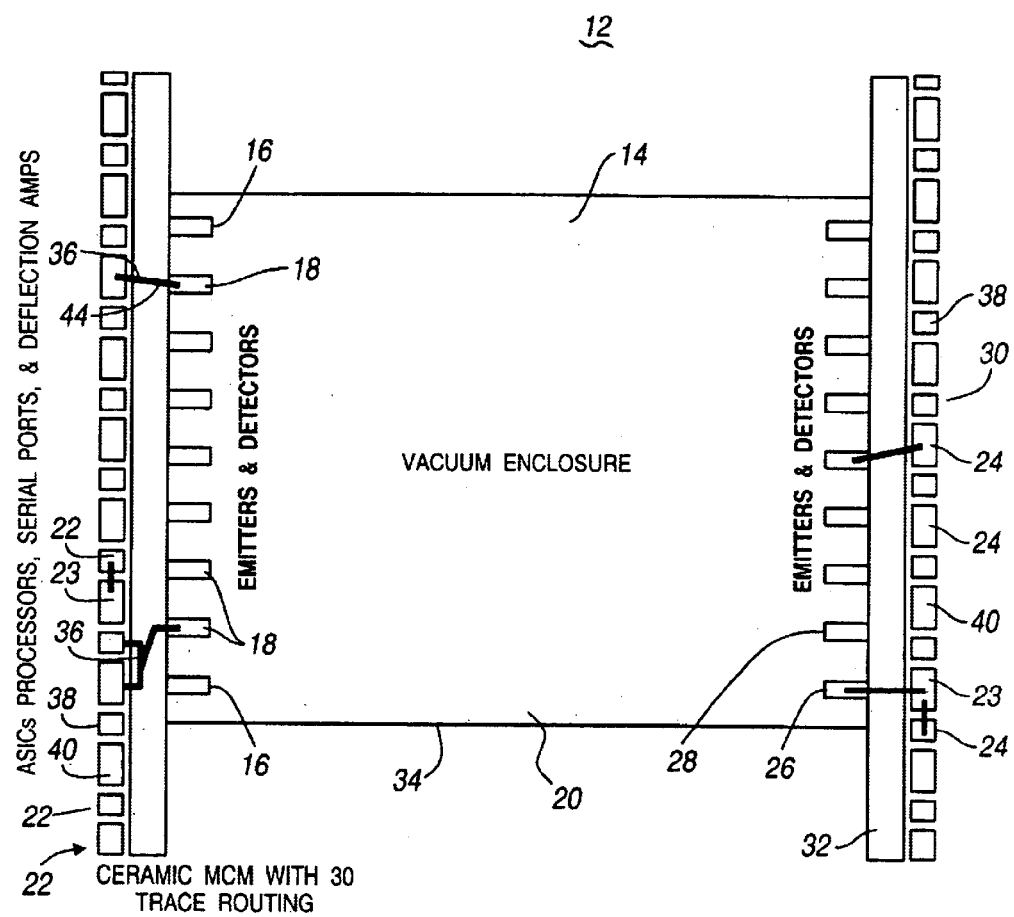
FIG. 1 is a electrical component, employing a free space electron switch, according to a first embodiment of the present invention.
Figure 2:
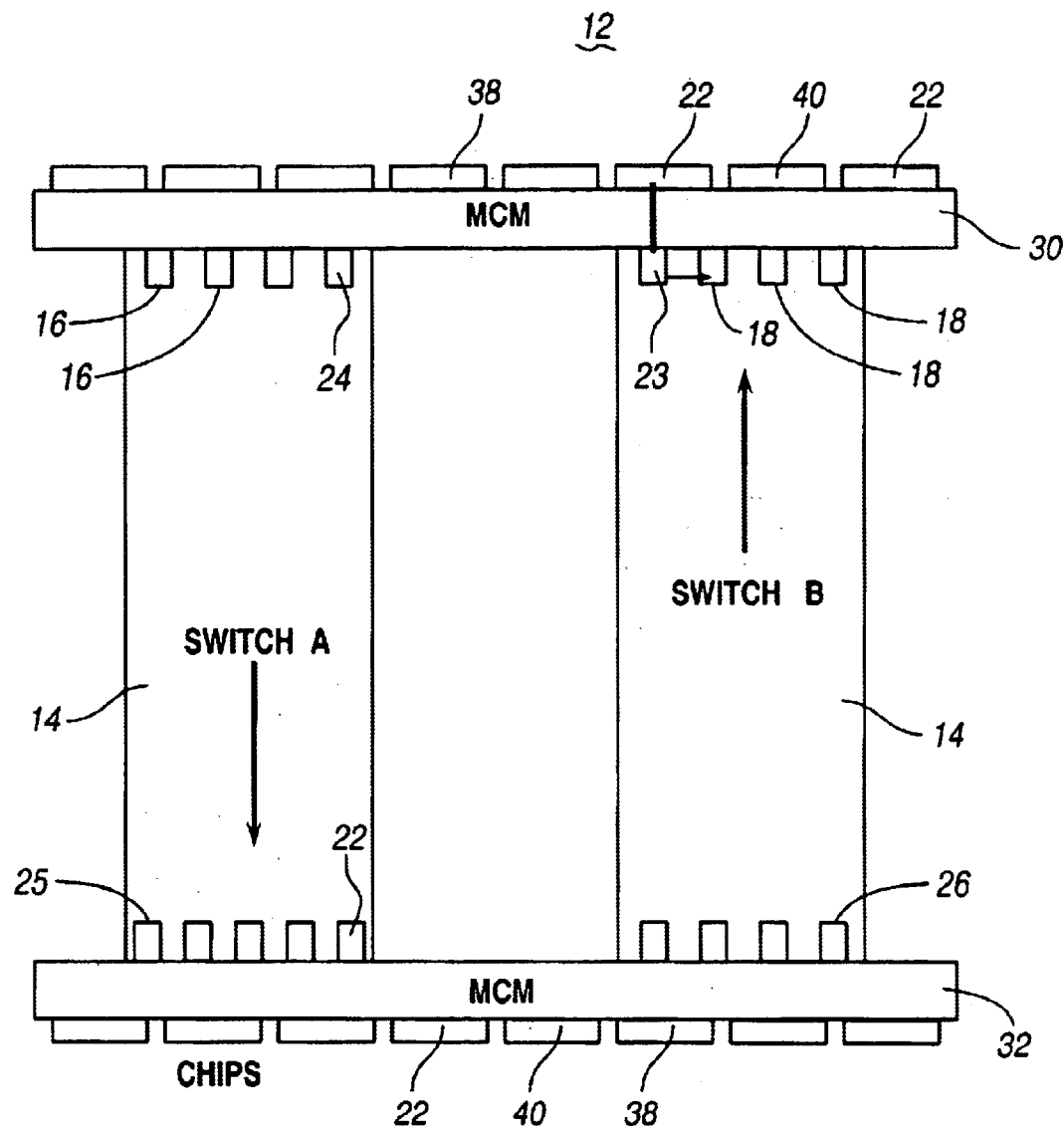
FIG. 2 is a electrical component, employing a free space electron switch, according to a second embodiment of the present invention.
Figure 3:
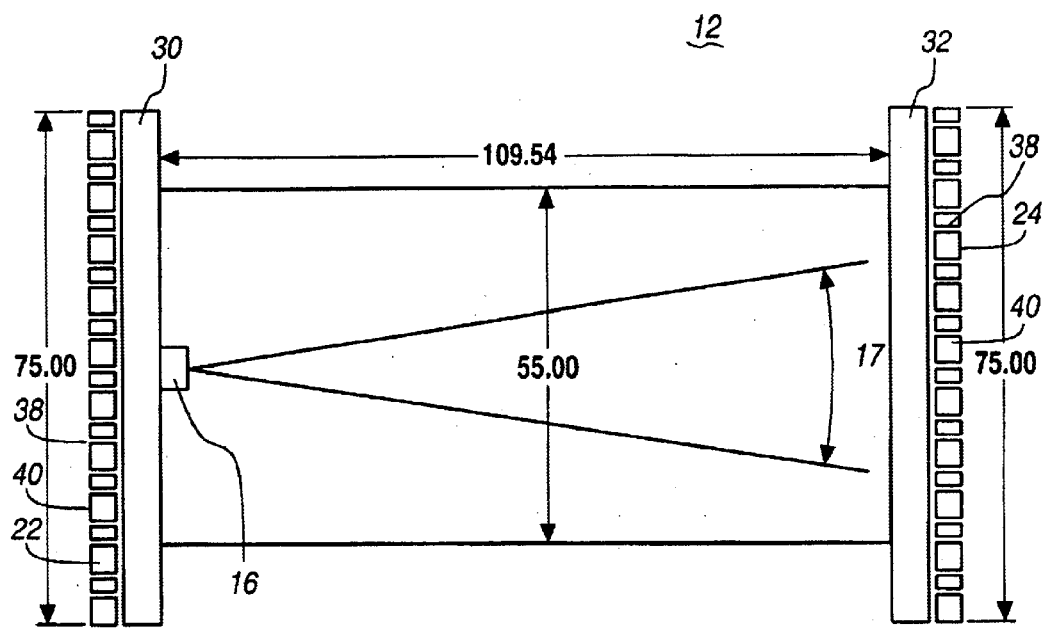
FIG. 3 is a electrical component, employing a free space electron switch, according to the first embodiment of the present invention.

Referring generally to FIGS. 1–3 which depict an electrical component 12 employing a free space electron switch 14 having a free space electron transmitter 16 and a free space electron receiver 18, according to the present invention. The electronic component 12 defines or is contained within a vacuum chamber 20. A plurality of first semi-conductor components 22 are coupled to the vacuum chamber 20, and are connected to at least one free space electron transmitter 16 and optionally to at least one free space electron receiver 18. The free space electron transmitters 16 and free space electron receivers 18 are disposed within the vacuum chamber 20.

A plurality of second semi-conductor components 24 are coupled to the vacuum chamber 20 and connected to an optional second free space electron transmitter 26 and a second free space electron receiver 28, which are disposed within the vacuum chamber 20. The first free space electron transmitter 16 is configured to transmit a signal from the first semi-conductor component 22 to the second free space electron receiver 28. The second free space electron transmitter 26 is configured to transmit a signal from the second semi-conductor component 24 to the first free space electron receiver 18.

The electronic component 12 has first and second generally parallel substrates 30 and 32. These substrates 30 and 32 can be made of ceramic, glass, or porcelain coated metal, and define a portion of the vacuum chamber 20. A first member 34 is disposed between the first and a second substrates 30 and 32 and defines a portion of the vacuum chamber 20. The semi-conductor components 22 and 24 are coupled to the substrates 30 and 32 and are connected to the free space electron transmitters 16 and the first free space electronic receivers 18 utilizing high speed transmission (greater than about 50 Mhz) lines 36.

It is envisioned that the electronic component 12 can be a parallel or serial processing computer. The first and second semi-conductors 22 and 24 can be either an analog computational logic component or a digital computational logic component. In this regard, the first and second semiconductors 22 and 24 can be a microprocessor 40. A particular benefit of the present invention is the ability interconnect a very high number of microprocessors 40 with little or no metallic traces between the microprocessors 40. Additionally, it is envisioned that the first and second semi-conductors 22 and 24 can be distributed memory 38 such as random access memory.

The microprocessors 40 have free space electronic transmitters 16 and free space electron receivers 18, which are configured to allow communication between the microprocessors 40 and distributed memory 38. It is envisioned that the first and second semi-conductor components 22 and 24 can share a single free space electronic transmitter 16 or use several free space electronic transmitters 16.

High speed connections between microprocessors 40 have traditionally been limited by noise and signal reflection issues. The electronic component 12 utilizing parallel coupled microprocessors 40 allow a single processor 40 to couple to any number of other microprocessors 40 utilizing a single set of high speed transmission line 36. In this regard, it is possible to couple any number of microprocessors 40 to each other, each microprocessor 40 having only a single set of high speed data transmission lines 36, thus significantly increasing data transmission properties.

The first and second semi-conductors 22 and 24 are preferably mounted on one side of the vacuum chamber 20 and optionally, but preferably not mounted within the vacuum. The free space electron transmitters 16 and free space electron receivers 18 are preferably mounted to and within the vacuum chamber 20. The first and second semi-conductors 22 and 24 on the outside of the vacuum chamber 20 are interconnected to the free space electron transmitters and free space electron receivers 18 on the inside of the vacuum chamber 20 via traces 44 that run in three dimensions through the first and second substrates 30 and 32.

It is preferred that the area occupied by the first and second semi-conductors 22 and 24 as close as possible or smaller than to the area of the free space electron transmitters 16 and free space electron receivers 18, in order to minimize the amount of fan-in. Flip-chip bonding and fine-pitch ball-grid arrays (not shown) can be used to enable this. The electronic component 12 has high pass filters disposed between free space electron receivers 18 and 28 and the first and second semi-conductor components 22 and 24. The high pass filter 23 is operable to block the D.C. high voltage component of the transmitted signal. The high pass filter preferably comprises a capacitor and is operable to allow signals greater than about 100 hz to reach the first semi-conductor component 22.

Figure 5:
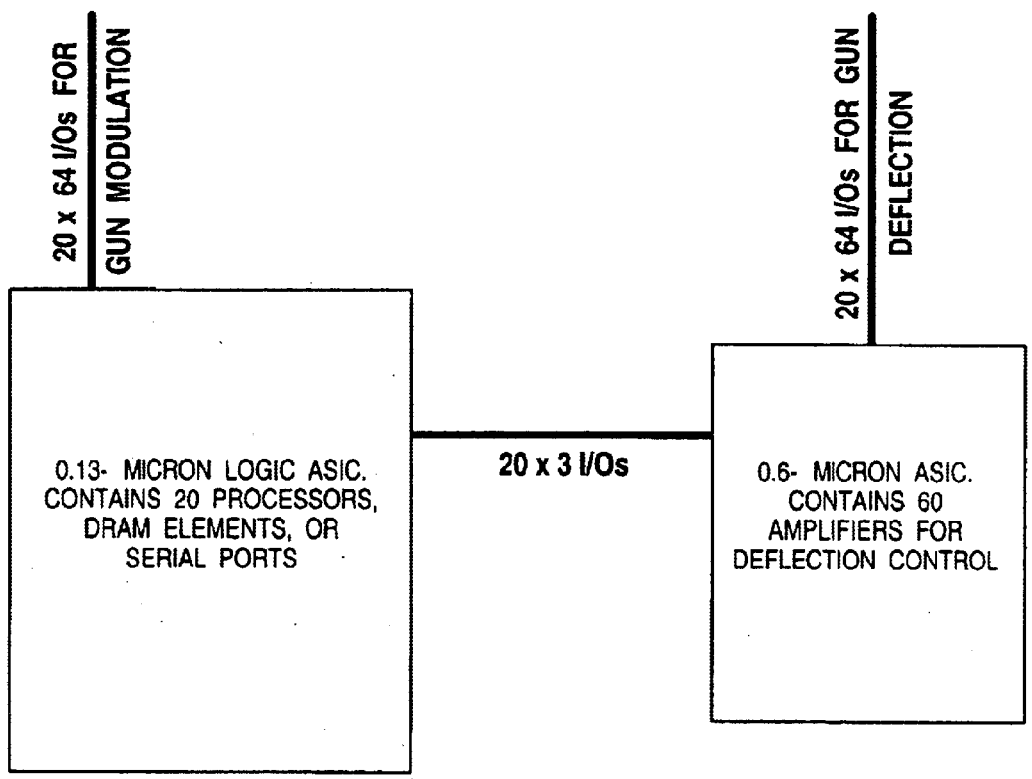

FIGS. 5 and 6 are block diagrams showing the operation of the electronic component 12 shown in FIG. 1. The logic formed by the semi-conductor components 22 and 24 on the outside of the vacuum chamber 20 will be arranged into "blocks". From a "system" perspective, each block will contain a processing unit 40, distributed memory 38, or serial port 42.

From a "device" perspective, each block will occupy approximately 20-mm² of silicon. Of this area, approximately 10-mm² will be occupied by logic, and approximately 10-mm² will be occupied by input/output circuitry (i.e., by the ball grid array). Within the vacuum chamber 20, it is preferred that a free space electron transmitter 16 containing 64 electron emitters and the free space electron receiver 18 containing 64 electron detectors within each 20-mm² block of substrate. This enables a pitch of 80-microns for each gun-emitter pair. It is envisioned that it may be possible to put the ball grid array and logic on separate layers of an ASIC. In such a case, the total processor area can be decreased to 10-mm² from 20-mm².

Emitters 72 and receivers 80 within the free space electron transmitters 16 and free space electron receivers 18 will be organized as 64-bit parallel links. To the semi-conductor devices 22 and 24 that is connected to the free space electron receiver 18, it will appear to be and behave identically to a 64-bit point-to-point link. The 64 guns and 64 detectors will share a single set of 64 traces from the inside of the vacuum chamber 20 to the outside of the vacuum chamber 20 in order to minimize the number of input/output circuitry needed on the ASICs that connect to the point-to-point links. This causes the point-to-point links to become unidirectional. Since standard parallel busses are also unidirectional, this is not a significant disadvantage.

It is preferred the entire bus width will be 64-bits. There will not be separate address, data busses, or control busses. This is enabled by the use of a standard bus architecture such as IBM's CoreConnect bus.

Figure 4:
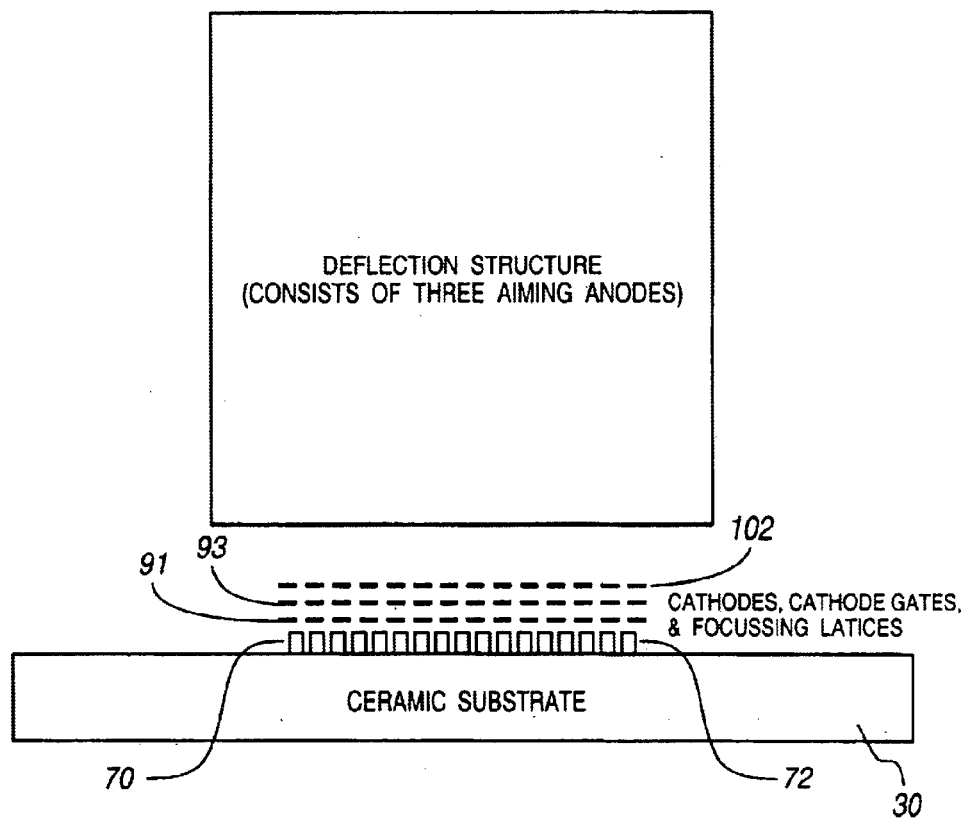
FIG. 4 is a side view of an electrical component, employing a free space electron switch, according to the first embodiment of the present invention.

Referring generally to FIG. 4, the vacuum chamber 20 will be up to 126-mm on a side, the emitters 72 of the free space electron transmitter 16 will not be required to have the capability to deflect across the entire enclosure. It is envisioned that each emitter 72 can deflect across an area that is 40-mm by 40-mm. Given a maximum deflection angle of 20 degrees, this indicates that the depth of the cylinder (i.e. the beam's "throw") should be about 4.3 inches. All 64 beams in each bus will be aimed in tandem. As a result, only a single deflection structure, and only a single set of deflection voltages are needed for each 64-bit link.

In order to obtain the high voltages necessary for deflecting the beams, two types of CMOS chips can be used. A 0.13-micron process will be used for digital logic and low-voltage analog circuits. A larger, perhaps 0.6-micron process will be used for the amplifiers that produce the high voltages that deflect the beams. The two types of semi-conductor components in the form of ASICs will be interconnected on the surface of the electrical component 12.

Each data bus will require 69 inputs/outputs from each low-voltage semi-conductor device. Of these 69 inputs/outputs, 65 will travel straight down the electronic device 12 to the other side of the vacuum chamber 20, where they will terminate at the electron gun modulation structures and the electron detectors.

The other four traces will be used for gun deflection. These traces will travel over the exterior surface of the substrates to the nearby high-voltage semi-conductor devices. The high-voltage semi-conductor devices will amplify the analog voltages that are sent over the traces to high voltages that are sufficient for driving the deflection anodes.

In order to enable a high density of semi-conductor devices on the outer surface of the electronic device, the number of traces from chip-to-chip on the electronic device must be kept to a minimum. This constraint makes it impractical to require the low-voltage CMOS to use an interconnect to the high-voltage semi-conductor devices for each of the 64 bus lines.

Figure 7:
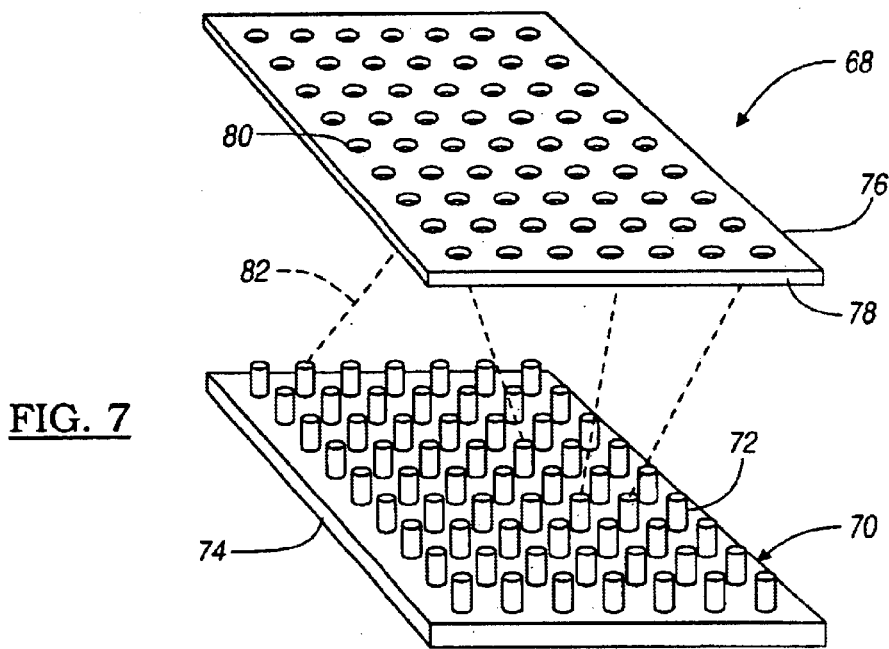
FIG. 7 is a block plan view of a free space electron transmitter and receiver, according to an embodiment of the present invention.

As shown in FIGS. 1, 4, and 7, the free space electron transmitters 16 and receivers 18 are planar arrays 70 and 76 of individual emitters 72 and detectors 80 that are facing each other. In alternate embodiments, the planes defining the arrays 44 may be "dished" to reduce deflection angles. Other designs may arrange the arrays 70 and 76 in various configurations, including positioning the detectors 80 and the emitters 72 in pairs. FIG. 7 is a block plan view of a free space electron transmitter 16 and receiver 18, according to an embodiment of the present invention. Each free space electron transmitter 16 has an array of cathode emitters 72. The cathode array 70 includes a plurality of cathodes 88, each of the cathodes 88 being operable to emit electrons. Additionally, each free space electron transmitter 16 has an anode or aiming grid, including a plurality of aiming anodes 102. Each of the aiming anodes 102 preferably defines a channel 90, and is operable to aim an electron beam formed from the electrons emitted from one of the cathodes 72. Additionally each free space electron transmitter 16 has a focusing grid 94 and an accelerating grid 93 disposed between the cathode array 70 and the free space electron receivers 80. The focusing grid 94 and accelerating grid 93 are operable to control the flow of electrons from each of the cathodes 72 into each of the channels 90.

Figure 8:
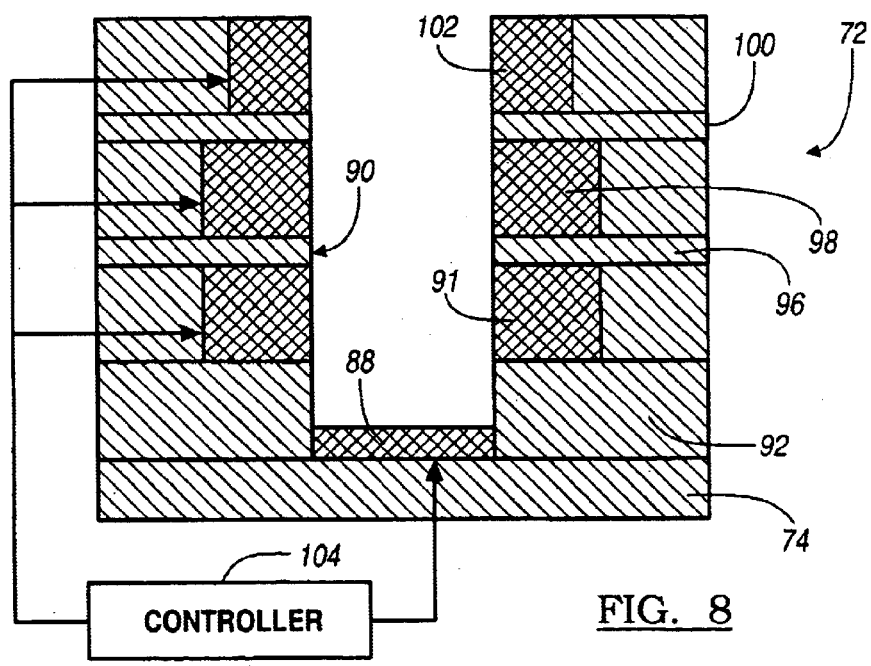
FIG. 8 is a cross-sectional view of a free space electron switch within a vacuum enclosure, according to another embodiment of the present invention.

FIG. 8 is a cross-sectional view of one of the emitters 72 showing the various components therein, according to the invention. Particularly, the emitter 72 includes a cathode 88 deposited on the substrate 74 at the end of an open channel 90. The cathode 88 is surrounded by a first insulator layer 92 on which is formed an annular modulating electrode 94. The terms modulating electrode and gate or gate structure will be used interchangeably throughout this discussion. A second insulator layer 96 is formed on the modulating electrode 94, and an annular focusing and/or accelerating electrode 98 is formed on the insulator layer 96. A third insulator layer 100 is formed on the focusing electrode 98, and an annular aiming anode 102 is formed on the insulator layer 100. In an alternate embodiment, the position of the electrodes 94 and 98 can be reversed. The various layers discussed herein can be deposited and patterned by any suitable semi-conductor fabrication technique.

The emitter 72 receives an electrical input signal that is converted by the cathode 88 into a beam of electrons. In one embodiment, the cathode 88 has a thickness of between 5 and 70 microns. If the cathode 88 is a hot cathode, it may be difficult to obtain high modulation rates because of the size of the cathode 88 and the relatively large distance between the cathode 88 and the modulating electrode 94 (gate). For those applications where the input signal is electrical (RF), the cathodes 88 can be cold cathodes. Cold cathodes are typically smaller than hot cathodes, and they do not generate significant heat. However, unlike photocathodes, it is difficult to modulate a cold cathode directly. Modulation is provided for a cold cathode by the modulating electrode 94 or a related gate structure.

Electrons generated by the cathode 88 are directed down the channel 90 and out of the emitter 72. The modulating electrode 94 generates a controllable electric field within the channel 90 that pulses (periodically inhibits) the electron beam 82 so as to impart a modulation thereon. The modulation of the electrons provides the data in the electron beam 82. The focusing electrode 98 provides an electric field that gathers and focuses the modulated electrons to allow them to be directed out of the channel 90. Additionally, the focusing electrode 98 accelerates the electron beam 82 to the desired speed. The aiming anode 102 generates a controlled electric field that causes the electron beam 82 to be directed to the desired detector 80. According to the invention, the aiming anode 102 can direct the electron beam 82 from the emitter 72 to any of the detectors 80.

In this embodiment, the modulating electrode 94, the focusing electrode 98 and the aiming anode 102 are annular members. However, this is by way of non-limiting example, in that other shaped electrodes can be provided suitable for the purposes discussed herein, as would be appreciated by those skilled in the art.

A controller 104 is provided to control the voltage signals applied to the modulating electrode 94, the focusing electrode 98 and the aiming anode 102. The controller 104 acts to impart the desired data onto the electron beam 82 through the modulation function, causes the speed of the electron beam 82 to be a certain desirable speed, and causes the aiming anode 102 to direct the electron beam 82 to the desired detector 80. The controller 104 would control several of the emitters 72 at a time, and possibly all of them. The controller 104 could be fabricated on the same wafer as the cathode array 70, or could be external thereto. By distributing the various controllers associated with the switch 12, the addressing requirements can be decreased. In one application, it may be useful to employ an ASIC within the vacuum chamber 20 to control the aiming anode 102. This would lead to a lesser number of interconnects extending through the enclosure.

Various types of other modulation techniques can be employed. For example, the switch design can take advantage of the scaling laws of the device. Particularly, as the distance between the emitters 72 decreases, and the emitters 72 are moved closer together, the required beam throw decreases. Decreasing the beam throw decreases the spot size of the beam, because the beam travels a shorter distance before striking the detector 80. Decreasing the beam spot size, decreases the amount of deflection necessary to blank the beam off of the detector 80. Thus, decreasing the amount of deflection, decreases the voltage requirement.

Figure 9:
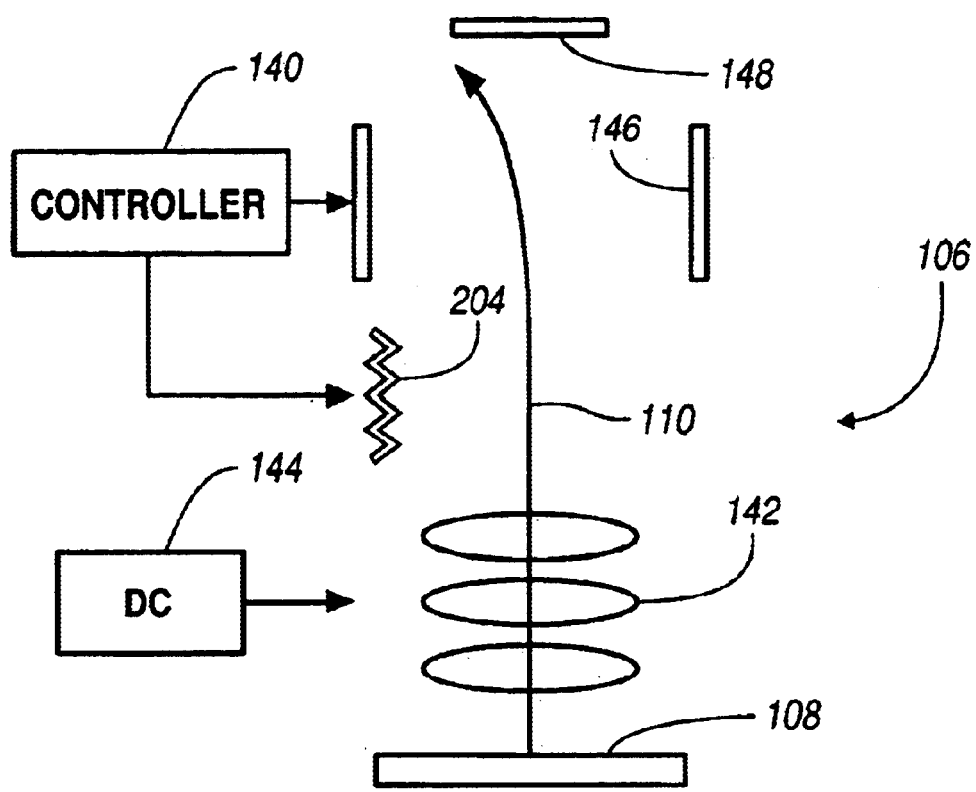
FIG. 9 is a side plan view of an emitter employing a blanking modulation technique, according to an embodiment of the present invention.

Alternately, as shown in FIG. 9, a slow wave modulator can be employed. A slow wave modulator is a transmission line that is shaped such that the linear velocity of a signal traveling over the transmission line is equal to the velocity of the electrons that are traveling near the transmission line. This technique allows for the use of a very long modulating anode that operates at very high speeds. The longer the anode, the lower the voltage needed to produce a given deflection. Further, a large number of electron guns can be used per emitter 72, where all of the guns are targeted at a single detector 80. Decreasing the beam current decreases the spot size of the beams, and therefore decreases the required modulation voltage. However, in many applications, a minimum beam current is needed in order to produce a useable signal on the output of the switch 14. Therefore, a large number of very low current beams may be combined at a single detector 80 to produce the necessary output current while still allowing low deflection voltages per beam.

As an alternative to modulating the electron beam 82 with a gate or the modulating electrode 94, the electron beam 82 could be modulated by a technique known as blanking. In blanking, the aiming anode 102 causes the electron beam 82 from a particular emitter 72 to impinge a particular detector 80 at one time and be aimed away from the detector 80 at another time. The electron beam 82 is steered off of the detector 80 in order to change the voltage received by the detector 80. The communications signal can be intermixed with the aiming signal on the aiming anode 102 to steer the beam 82 on or off the detector 80. This allows a steady state signal to be applied to the cathode 88. Blanking allows greater modulation rates to be achieved by directly modulating the cathode 88 with a gate electrode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. An electronic component comprising:
   first and second substrates;
   a first member disposed between said first and a second substrates, said first member defining a vacuum chamber;
   a first semi-conductor component coupled to the first substrate, said first semi-conductor component in connection with a first free space electron transmitter and a first free space electronic receiver disposed within said vacuum chamber;
   a second semi-conductor component coupled to the second substrate, said second semi-conductor component in connection with a second free space electron transmitter and a second free space electronic receiver disposed within said vacuum chamber;
   wherein said first transmitter is configured to transmit a signal from said first semi-conductor component to the second free space electron receiver and wherein said second transmitter is configured to transmit a signal from said second semi-conductor component to the first free space electronic receiver.

2. The electronic component according to claim 1 wherein, the first semi-conductor component is disposed within said vacuum chamber.

3. The electronic component according to claim 1 wherein the first and second semi-conductor components are disposed outside of said vacuum chamber.

4. The electronic component according to claim 1 wherein said first semi-conductor component is one of an analog computational logic component and a digital computational logic component.

5. The electronic component, according to claim 1 wherein said first semi-conductor component is one of an analog signal processing component and a digital signal processing component.

6. The electronic component according to claim 4 wherein said second semi-conductor component is a microprocessor.

7. The electronic component according to claim 1 further comprising a high pass filter electrically disposed between the first free space electron receiver and said first semi-conductor component.

8. The electronic component according to claim 7 wherein the high pass filter is operable to block the D.C. high voltage component of the signal.

9. The electronic component according to claim 7 wherein the high pass filter comprises a capacitor and is operable to allow signals greater than 100 hz to reach said first semi-conductor.

10. The electronic component according to claim 1 further comprising a high pass filter electrically disposed between said second free space electron receiver and said second semi-conductor component.

11. The electronic component according to claim 1 further comprising a third semi-conductor device coupled to the first ceramic substrate and a fourth semi-conductor device disposed on the second ceramic substrate.

12. The electronic component according to claim 11 wherein said first and third semi-conductor devices comprise a logic circuit.

13. The electronic component according to claim 12 wherein said first and third semi-conductor devices are microprocessors.

14. The electronic component according to claim 13 wherein said second and fourth semi-conductor devices are microprocessors.

15. The electronic component according to claim 11 wherein said third semi-conductor component is in connection with a third free space electron transmitter and a third free space electron receiver disposed within said vacuum chamber; and
   said fourth semi-conductor component has a fourth free space electron transmitter and a fourth free space electron receiver disposed within said vacuum chamber; and wherein said third free space electron transmitter is configured to transmit a signal from said third semi-conductor component to at least one of the second and fourth free space electron receivers and wherein said second transmitter is configured to transmit a signal from said second semi-conductor component to at least one of said first free space electron receiver and third free space electron receiver.

16. The electronic components according to claim 11 wherein said first free space electron transmitter comprises, a cathode array, said cathode array including a plurality of cathodes, each of said cathodes operable to emit electrons;
   an anode grid, said anode grid including a plurality of aiming anodes, each of said aiming anodes defining a channel, each anode operable to aim an electron beam formed from the electrons emitted from one of said cathodes; and
   a focusing grid and an accelerating grid disposed between said cathode array and said second free space electron receiver, said focusing grid and accelerating grid being operable to control the flow of electrons from each of said cathodes into each of said channels.

17. The electronic components according to claim 16 wherein said first free space electron receiver comprises: plurality of the output ports, each output port operable to receive an electron beam from at least one cathode.

18. The electronic components according to claim 16 wherein each of said aiming anodes extend in two dimensions of each said cathodes such that the channels have a surrounding periphery of aiming anodes.

19. The electronic components according to claim 16 wherein each of said aiming anodes are responsive to a charge which is configured to selectively aim the emitted electrons to an output port.

20. The electronic components according to claim 16 wherein the cathode is a cold cathode.

21. A parallel processing computer comprising:
   first and second substrates;
   a vacuum chamber;
   a first microprocessor coupled to a first free space electron transmitter which is disposed within said vacuum chamber;
   a second semi-conductor component coupled to a second free space electron transmitter and a second free space electron receiver which are disposed within said vacuum chamber; and
   wherein said first free space electron transmitter is configured to transmit a signal from said first microprocessor component to the second free space electron receiver.

22. The parallel processor according to claim 21 further comprising a first free space electron receiver, wherein said second electron transmitter is configured to transmit a signal from said second semi-conductor component to the first free space electron receiver.

23. The parallel processor according to claim 21 wherein the first microprocessor is coupled to the first free space electron transmitter via a high speed data connection.

24. An electronic component comprising:
- a vacuum chamber;
- a first semi-conductor component coupled to the vacuum chamber, said first semi-conductor component connected to a first free space electron transmitter and a first free space electron receiver disposed within said vacuum chamber;
- a second semi-conductor component coupled to said vacuum chamber, said second semi-conductor component connected to a second free space electron transmitter and a second free space electron receiver disposed within said vacuum chamber;
- wherein said first transmitter is configured to transmit a signal from said first semi-conductor component to the second free space electron receiver and wherein said second transmitter is configured to transmit a signal from said second semi-conductor component to the first free space electron receiver.

25. The electronic component according to claim 24 wherein the first semi-conductor component is disposed within said vacuum chamber.

26. The electronic component according to claim 24 wherein the first and second semi-conductor components are disposed outside of said vacuum chamber.

27. The electronic component according to claim 24 wherein said first semi-conductor component is a microprocessor.

28. The electronic component according to claim 24 wherein said second semi-conductor component is a microprocessor.

29. The electronic component, according to claim 24 wherein said first semi-conductor component is a RAM.

30. The electronic components according to claim 24 further comprising a high band pass filter electrically disposed between the first free space electron receiver and said first semi-conductor component.

31. The electronic components according to claim 24 further comprising a high pass filter electrically disposed between said second free space electron receiver and said second semi-conductor component.

* * * * *

UNITED STATES PATENT AND TRADEMARK OFFICE
CERTIFICATE OF CORRECTION

PATENT NO.    : 6,800,877 B2
DATED         : October 5, 2004
INVENTOR(S)   : Michel N. Victor et al.

It is certified that error appears in the above-identified patent and that said Letters Patent is hereby corrected as shown below:

Title page,
Item [57], ABSTRACT,
Line 7, after "transmit" delete "a"

Column 1,
Line 18, after "Fabric," insert -- " --.
Line 23, before "Switching" insert -- " --.

Column 2,
Line 22, after "number" delete ",".
Line 35, "circuit's" should be -- circuits --.
Line 65, after "and" delete "a".

Column 3,
Line 7, 1st occurrence, after "and" delete "a".
Line 17, after "and" delete "a".
Line 41, 1st occurrence, delete "a".
Line 65, 1st occurrence, "a" should be -- an --.

Column 4,
Lines 1 and 4, 1st occurrence, "a" should be -- an --.
Line 56, delete "a".

Column 5,
Line 2, after "ability" insert -- to --.
Line 20, "line" should be -- lines --.

Column 9,
Line 8, 2nd occurrence, after "and" delete "a".

UNITED STATES PATENT AND TRADEMARK OFFICE
CERTIFICATE OF CORRECTION

PATENT NO. : 6,800,877 B2
DATED : October 5, 2004
INVENTOR(S) : Michel N. Victor et al.

It is certified that error appears in the above-identified patent and that said Letters Patent is hereby corrected as shown below:

Column 12,
Lines 14 and 17, "components" should be -- component --.

Signed and Sealed this

Ninth Day of August, 2005

JON W. DUDAS
*Director of the United States Patent and Trademark Office*